United States Patent

Lee

[11] Patent Number: 5,716,212
[45] Date of Patent: Feb. 10, 1998

[54] TEACHING AID

[75] Inventor: Jenny Lee, Tainan, Taiwan

[73] Assignee: Carnation Innovations Ltd., Taiwan

[21] Appl. No.: 782,793

[22] Filed: Jan. 13, 1997

[51] Int. Cl.[6] ................................................. G09B 1/06
[52] U.S. Cl. ...................... 434/159; 273/272; 434/172
[58] Field of Search ................................. 434/170, 171, 434/159, 208, 209; 273/272, 299, 292, 307

[56] References Cited

U.S. PATENT DOCUMENTS

| | | | |
|---|---|---|---|
| 1,282,513 | 10/1918 | Withington | 434/172 |
| 3,224,114 | 12/1965 | Swanson | 273/272 |
| 3,460,835 | 8/1969 | Crinns | 273/272 |
| 4,416,455 | 11/1983 | Munson et al. | 434/172 |
| 4,776,597 | 10/1988 | Rudell | 273/272 |
| 5,027,523 | 7/1991 | MacLoed | 434/171 |
| 5,203,706 | 4/1993 | Zamir | 434/172 |
| 5,288,068 | 2/1994 | Roth | 273/299 |
| 5,395,118 | 3/1995 | Barrett | 273/272 |
| 5,653,594 | 8/1997 | Lai | 434/172 |

*Primary Examiner*—Paul J. Hirsch
*Attorney, Agent, or Firm*—A & J

[57] ABSTRACT

A teaching aid including a face panel having a flat front chamber and a plurality of squares defined within the flat front chamber and marked with a respective mark, a partition panel fitted into the flat chamber of the face panel and having a plurality of slots corresponding to the squares of the face panel, a set of mother blocks adapted for fitting into the slots of the partition panel, each mother block having an insertion hole of a particular design, and a set of differently shaped daughter blocks adapted for fitting into the insertion holes of the mother blocks respectively.

3 Claims, 5 Drawing Sheets

TEACHING AID

BACKGROUND OF THE INVENTION

1. Field of the Invention

This invention relates to teaching aids, and more particularly to such a teach aid for young children to play with and to learn arithmetical signs, phonetic signs, or alphabetical letters, etc. when playing.

2. Description of the Prior Art

Various teaching aids have been disclosed for young children to play with, and to learn arithmetical signs, phonetic signs, or alphabetical letters when playing. However, these teaching aids are monotonous and practical for play in one way only, because they are simply comprised of a slotted base plate, and a set of differently figures blocks to be inserted into respective slots in the slotted base plate.

SUMMARY OF THE INVENTION

This invention provides a teaching aid which can be played by young children in many ways, enabling young children to learn arithmetical signs, phonetic signs, or alphabetical letters, etc. during the play. According to one embodiment of the present invention, the teaching aid is comprised of a face panel, a partition panel, a set of mother blocks, and a set of daughter blocks. The face panel has a flat front chamber, and a plurality of squares defined within the flat front chamber and marked with a respective mark. The partition panel is fitted into the flat chamber of the face panel, having a plurality of slots corresponding to the squares of the face panel. The mother blocks are adapted for fitting into the slots of the partition panel, each mother block having an insertion hole of a particular design. The daughter blocks are adapted for fitting into the insertion holes of the mother blocks respectively, and can be made in the form of a set of arithmetical blocks, alphabetic blocks, phonetic blocks, etc.

DETAILED DESCRIPTION OF THE PREFERRED EMBODIMENT

Figure 1:
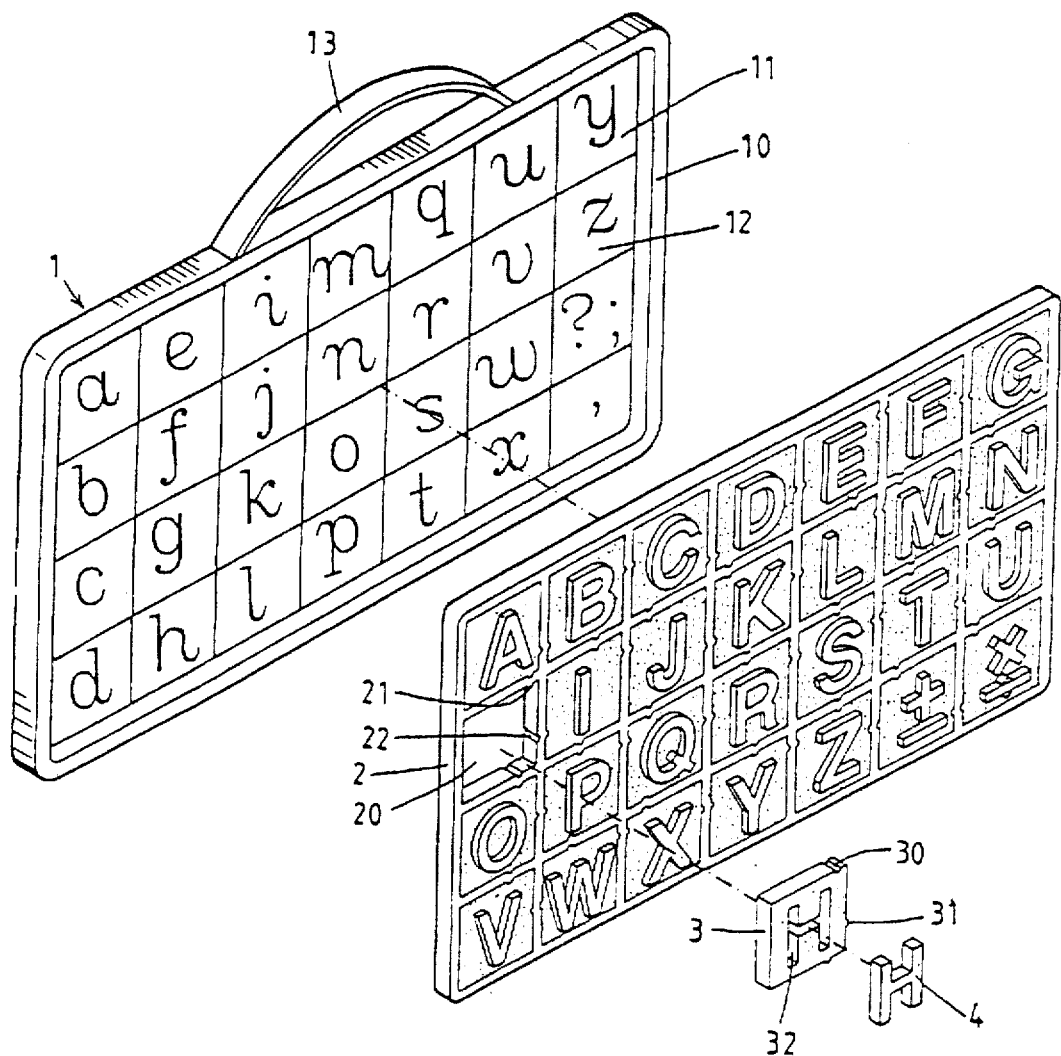
FIG. 1 is an exploded view of a teaching aid according to the present invention.

For the purpose of promoting an understanding of the principles of the invention, reference will now be made to the embodiment illustrated in the drawings. Specific language will be used to describe same. It will, nevertheless, be understood that no limitation of the scope of the invention is thereby intended, such alterations and further modifications in the illustrated device, and such further applications of the principles of the invention as illustrated herein being contemplated as would normally occur to one skilled in the art to which the invention relates.

Figure 2:
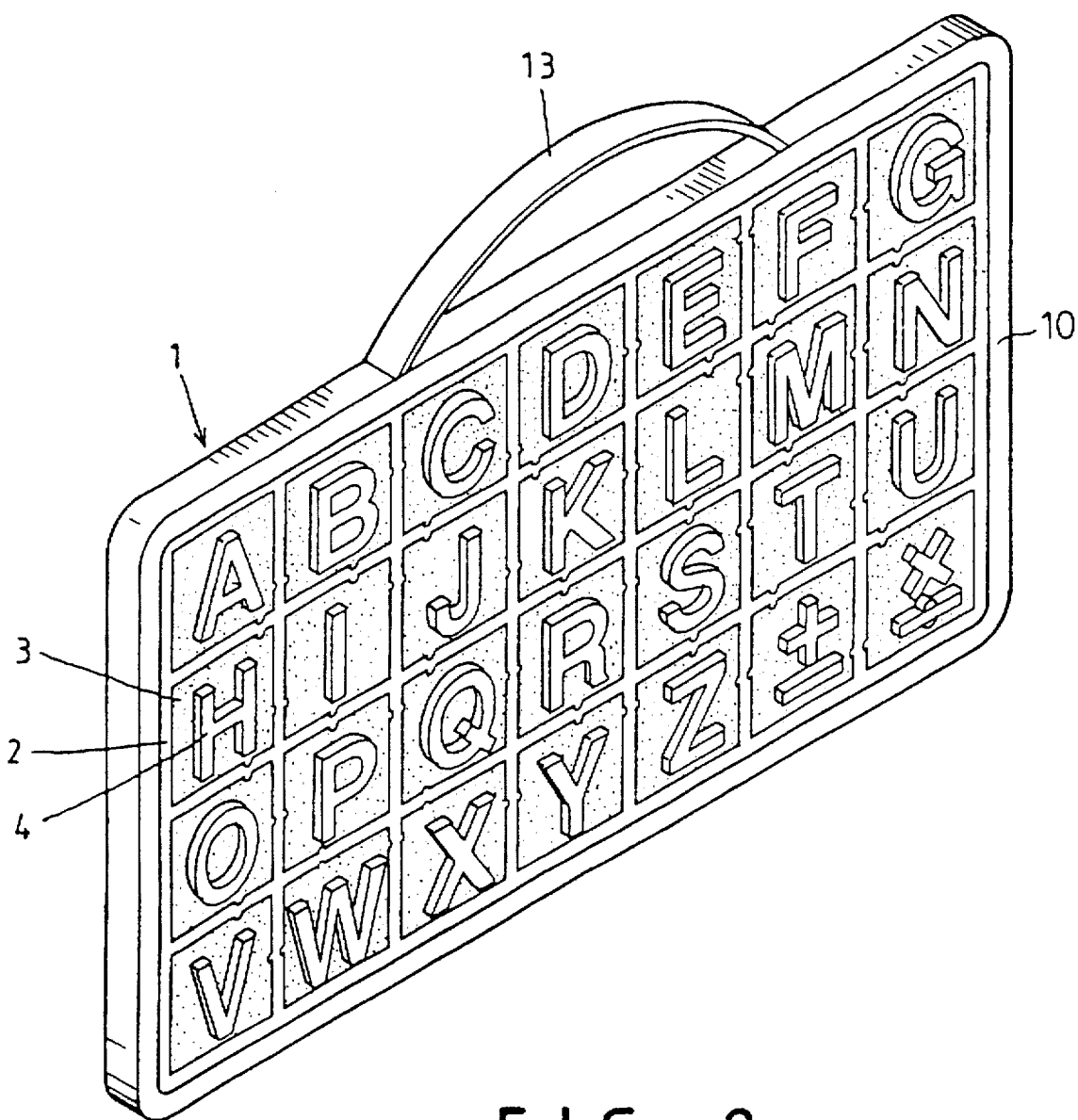
FIG. 2 is an assembly view of the present invention.

Referring to FIGS. 1 and 2, a teaching aid in accordance with the present invention is generally comprised of a face panel 1, a partition panel 2, a plurality of mother blocks 3, and a plurality of daughter blocks 4. The face panel 1 is a flat, rectangular panel having a flange 10 raised from the front side along the periphery and defining a flat chamber 11. The surface of the flat chamber 11 is divided into a plurality of squares 12. The squares 12 are marked with a respective mark, that can be a letter, a number, an arithmetical sign, or a phonetic sign, etc. Further, a handle 13 is provided at the top side of the face panel 1 so that the teaching aid can be carried with the hand. The partition panel 2 fits the flat chamber 11 of the face panel 1, comprising a plurality of slots 20 corresponding to the squares 12 of the face panel 1. Each slot 20 comprises at least one locating flange 21 and at least one locating groove 22. When the partition panel 2 is fitted into the flat chamber 11 of the face panel 11, the face panel 1 and the partition panel 2 are firmly retained together, and the marks of the squares 12 are seen from the outside through the slots 20. The mother blocks 3 fit the slots 20 of the partition panel 2. Each mother block 3 comprises at least one locating groove 30 and at least one locating flange 31 corresponding to the at least one locating flange 21 and at least one locating groove 22 of each slot 20, and an insertion hole 32. The insertion holes 32 of the mother blocks 3 are shaped to match with the daughter blocks 4 respectively. When the mother blocks 3 are respectively inserted into the slots 20 of the partition panel 2, the locating grooves 30 and locating flanges 31 of the mother blocks 3 are respectively forced into engagement with the locating flanges 21 and locating grooves 22 of the slots 20 of the partition panel 2. The daughter blocks 4 can be alphabetic blocks, arithmetical blocks, Chinese phonetic sign blocks etc., adapted to be inserted into the insertion holes 32 of the mother blocks 3 respectively. Further, the marks of the squares 12 of the face panel 1 must match the shapes of the daughter blocks 4. For example, if the daughter blocks 4 are made in the form of a set of arithmetical blocks, the marks of the squares 12 of the face panel 1 shall be made in the form of a 9×9 multiplication conversion table.

Figure 3:
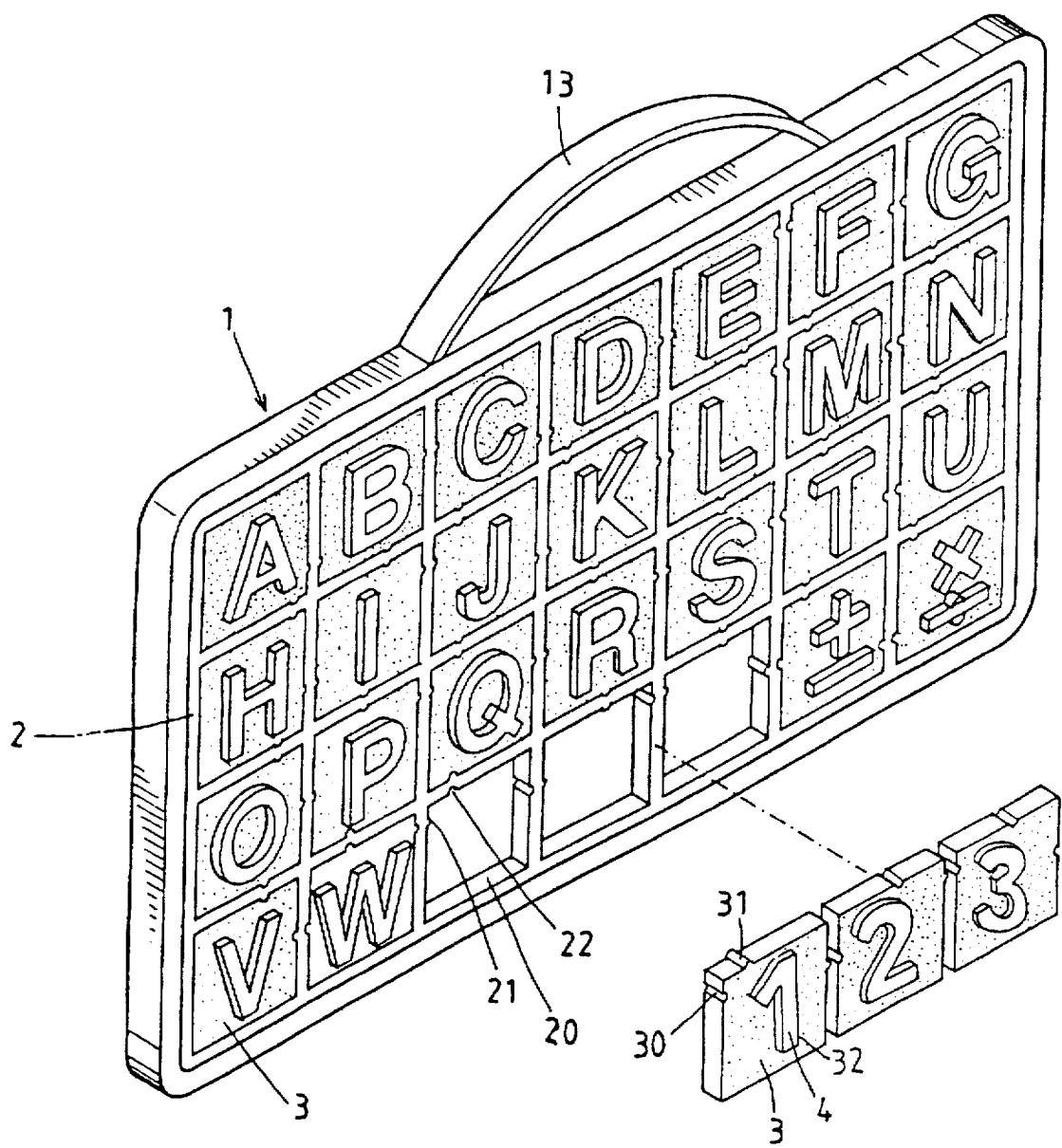
FIG. 3 shows one application example of the present invention.

Referring to FIG. 3, when in use, a child is taught to insert the daughter blocks 4 in the insertion holes 32 of the mother blocks 3. When trying to insert the daughter blocks 4 in the insertion holes 32 of the mother blocks 3 correctly, the child is taught to learn numbers, arithmetical signs, phonetic signs, English alphabet, etc. When the daughter blocks 4 are respectively inserted into the insertion holes 32 of the mother blocks 3, the child is taught to insert the mother blocks 3 in the slots 20 of the partition panel 3 by matching the signs of the respective daughter blocks 4 with the marks of the respective squares 12 in the face panel 1.

Figure 4:
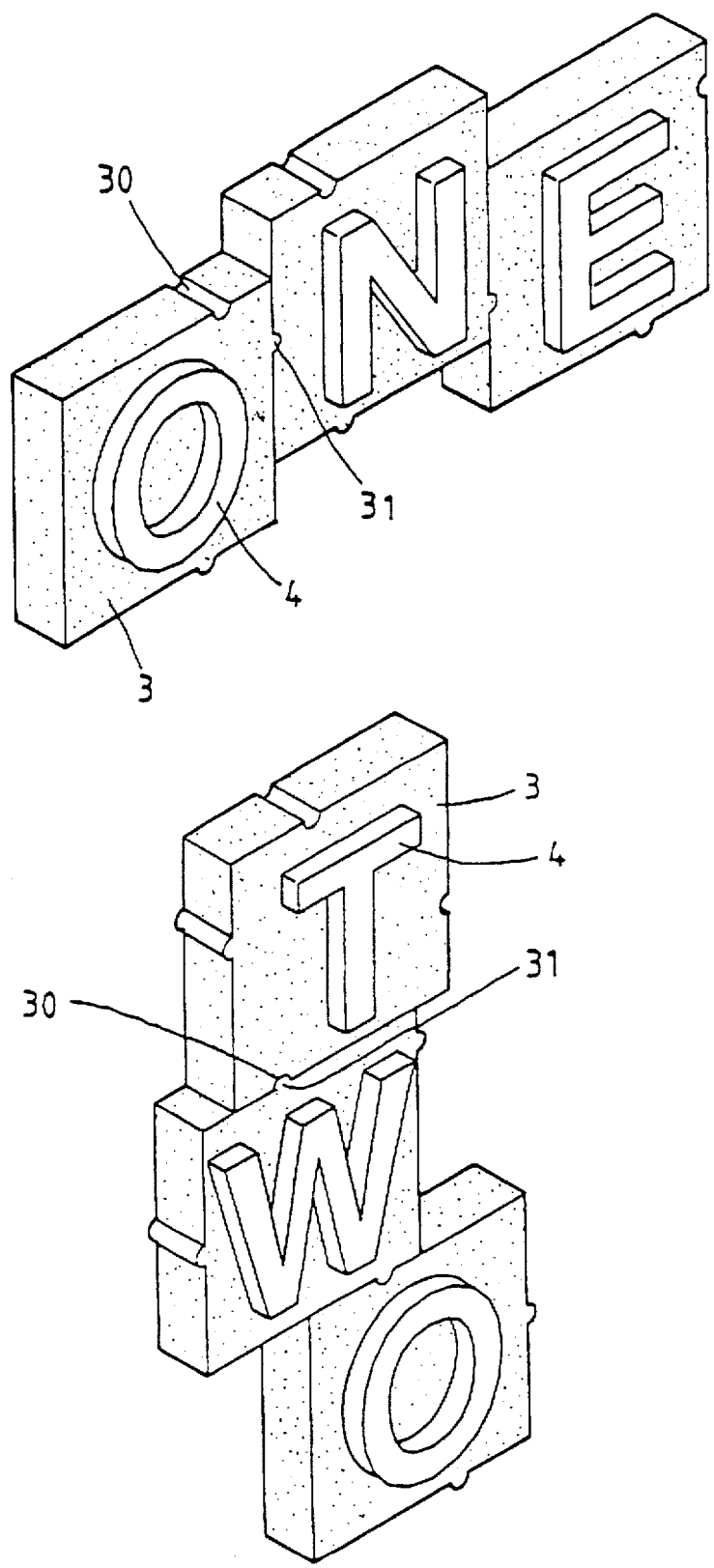
FIG. 4 shows another application example of the present invention.

Referring to FIG. 4, the mother blocks 3 can be removed from the partition panel 2, and then connected with one another to form for example a vocabulary, by engaging one locating groove 30 of one mother block with one locating flange 31 of another.

Figure 5:
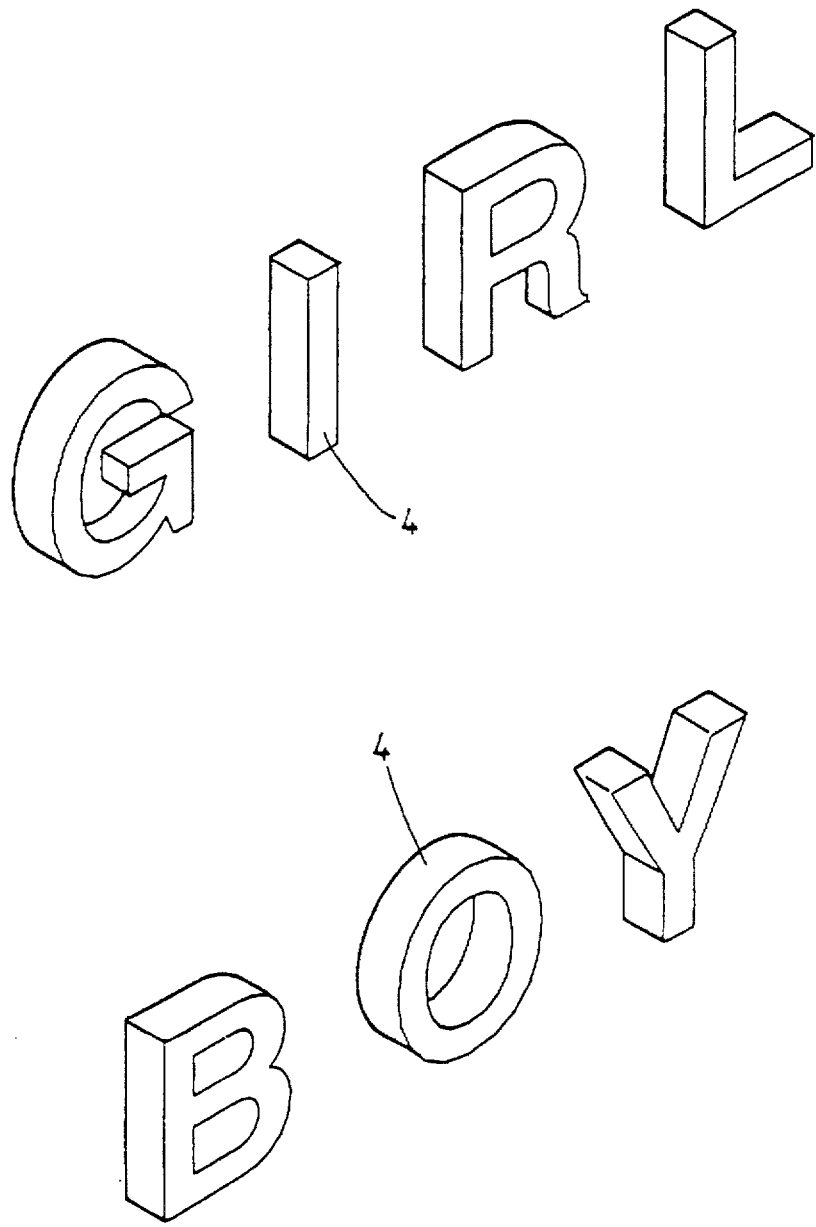
FIG. 5 shows still another application example of the present invention.

Referring to FIG. 5, the daughter blocks 4 may be separately played and arranged into for example a vocabulary.

The invention is naturally not limited in any sense to the particular features specified in the forgoing or to the details of the particular embodiment which has been chosen in order to illustrate the invention. Consideration can be given to all kinds of variants of the particular embodiment which has been described by way of example and of its constituent elements without thereby departing from the scope of the invention. This invention accordingly includes all the means constituting technical equivalents of the means described as well as their combinations.

I claim:

1. A teaching aid comprising:

a face panel, said face panel comprising a flange raised around the border at a front side thereof and defining a flat chamber, said flat chamber having a flat surface divided into a plurality of squares respectively marked with a respective mark;

a partition panel fitted into the flat chamber of said face panel, said partition panel comprising a plurality of slots corresponding to the squares of said face panel;

a set of mother blocks adapted for fitting into the slots of said partition panel, each of said mother blocks having an insertion hole of a particular design; and a set of differently shaped daughter blocks adapted for fitting into the insertion holes of said mother blocks respectively.

2. The teaching aid as claimed in claim 1, wherein said face panel has a handle at one side.

3. The teaching aid as claimed in claim 1, wherein each of the slots of said partition panel has at least one locating groove and at least one locating flange; and each of said mother blocks has at least one locating flange and at least one locating groove for engagement with the at least one locating groove and at least one locating flange of one slot of said partition panel.

* * * * *